United States Patent
Lee et al.

(10) Patent No.: US 9,138,827 B2
(45) Date of Patent: Sep. 22, 2015

(54) METHOD OF LASER WELDING

(71) Applicant: SUNGWOO HITECH CO., LTD., Busan (KR)

(72) Inventors: Mun Yong Lee, Busan (KR); Byung-Sun Song, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 307 days.

(21) Appl. No.: 13/713,174

(22) Filed: Dec. 13, 2012

(65) Prior Publication Data

US 2014/0124488 A1    May 8, 2014

(30) Foreign Application Priority Data

Nov. 6, 2012 (KR) .................. 10-2012-0124819

(51) Int. Cl.
| | |
|---|---|
| *B23K 26/00* | (2014.01) |
| *B23K 26/02* | (2014.01) |
| *B23K 26/24* | (2014.01) |
| *B23K 26/32* | (2014.01) |

(52) U.S. Cl.
CPC ........... *B23K 26/246* (2013.01); *B23K 26/3206* (2013.01); *B23K 2203/04* (2013.01)

(58) Field of Classification Search
CPC ........ B23K 26/00; B23K 26/02; B23K 26/04; B23K 26/06
USPC ............... 219/121.6, 121.61, 121.63, 121.73, 219/121.75, 121.78, 121.79, 121.64
See application file for complete search history.

(56) References Cited

U.S. PATENT DOCUMENTS

| | | | | |
|---|---|---|---|---|
| 4,642,446 | A * | 2/1987 | Pennington | 219/121.64 |
| 4,831,235 | A * | 5/1989 | Kishi et al. | 219/125.12 |
| 5,130,515 | A * | 7/1992 | Toyoda et al. | 219/125.12 |
| 5,187,346 | A * | 2/1993 | Bilge et al. | 219/121.64 |
| 5,451,742 | A * | 9/1995 | Nishio et al. | 219/121.64 |
| 5,595,670 | A * | 1/1997 | Mombo-Caristan | 219/121.64 |
| 5,603,853 | A * | 2/1997 | Mombo-Caristan | 219/121.64 |
| 7,154,065 | B2 * | 12/2006 | Martukanitz et al. | 219/121.64 |
| 8,350,185 | B2 * | 1/2013 | Lee et al. | 219/121.64 |
| 2006/0222457 | A1* | 10/2006 | Becker et al. | 403/270 |
| 2006/0255019 | A1* | 11/2006 | Martukanitz et al. | 219/121.64 |
| 2007/0210042 | A1* | 9/2007 | Forrest et al. | 219/121.64 |
| 2008/0245777 | A1* | 10/2008 | Cremerius et al. | 219/121.64 |
| 2008/0296271 | A1* | 12/2008 | Klein et al. | 219/121.64 |

(Continued)

FOREIGN PATENT DOCUMENTS

| | | |
|---|---|---|
| JP | 07-032180 | 2/1995 |
| JP | 3084152 | 9/2000 |

(Continued)

*Primary Examiner* — Dana Ross
*Assistant Examiner* — Michael Laflame, Jr.
(74) *Attorney, Agent, or Firm* — Lex IP Meister, PLLC

(57) ABSTRACT

A method of laser welding is disclosed. The method may be performed after an upper steel plate and a lower steel plate are overlapped. The method may include: forming a molten pool at the upper steel plate and the lower steel plate and welding the upper steel plate and the lower steel plate by irradiating a laser beam of focal region to a welding portion of the upper steel plate and the lower steel plate along a main welding pattern; and melting a peripheral portion of a keyhole formed at an end of the main welding pattern and welding the upper steel plate and the lower steel plate by irradiating the laser beam of the focal region along a fine welding pattern added to an end portion of the main welding pattern.

13 Claims, 7 Drawing Sheets

(56) References Cited

U.S. PATENT DOCUMENTS

| | | | |
|---|---|---|---|
| 2010/0095002 A1* | 4/2010 | Viger et al. | 709/226 |
| 2011/0259857 A1* | 10/2011 | Johnson | 219/121.63 |
| 2011/0266263 A1* | 11/2011 | Hagihara et al. | 219/121.64 |
| 2012/0160815 A1* | 6/2012 | Hayashimoto et al. | 219/121.64 |

FOREIGN PATENT DOCUMENTS

| | | |
|---|---|---|
| JP | 2009-183970 | 8/2009 |
| JP | 2011-230158 | 11/2011 |
| JP | 2012-135794 | 7/2012 |
| KR | 10-2010-0071588 | 6/2010 |
| KR | 10-1116638 | 6/2011 |

* cited by examiner

METHOD OF LASER WELDING

CROSS-REFERENCE TO RELATED APPLICATION

This application claims priority to and the benefit of Korean Patent Application No. 10-2012-0124819 filed in the Korean Intellectual Property Office on Nov. 6, 2012, the entire contents of which are incorporated herein by reference.

BACKGROUND OF THE INVENTION (a) Field of the Invention

The present invention relates to a method of laser welding. More particularly, the present invention relates to a method of laser welding which can reduce a pin hole generated at an end portion of a welding portion when the laser welding is performed after steel plates are overlapped.

(b) Description of the Related Art

Generally, a spot welding is mainly used as a welding method for assembling components of a vehicle body, and an arc welding or a laser welding is used at welding portions to which the spot welding cannot be applied.

Particularly, since the laser welding has merits such that a filler metal is not required, a welding cycle is short due to fast welding speed, a heat input is low, a heat affected zone (HAZ) is small, and a deformation is small, as shown in FIG. 1, the laser welding is increasingly used for welding the components of the vehicle body instead of the spot welding and the arc welding.

A keyhole welding using energy reflection and absorption in a focal region of a laser beam is mainly used as the laser welding. The keyhole welding is done in the focal region at which the laser beam is collected to welding materials by a lens and energy reflection and absorption occur.

That is, the laser beam collides with the welding materials in the focal region where electromagnetic wave energy of the laser beam is collected, and collision energy is converted into heat energy such that keyhole of the electromagnetic wave occurs. Accordingly, the keyhole welding is performed. The keyhole welding is a welding performed by making small hole at a molten pool due to vapor pressure when laser welding.

A laser welding system shown in FIG. 1 welds steel sheets or plated steel sheets.

According to the laser welding system, a laser head 5 is mounted at a front end of an arm 3 of a robot 1, and the laser head 5 is connected to a laser oscillator 7 through a optical fiber.

The robot 1 is operated by a robot controller C, and the laser head 5 is moved along a welding portion W (referring to FIG. 3) of the welding material 9 by the robot 1. Therefore, the laser head 5 irradiates a laser beam LB and performs the welding process.

A conventional laser welding, however, is a keyhole welding of high power. Since the molten pool for filling up a keyhole positioned at an end portion of a welding pattern of the welding portion W is insufficient according to the keyhole welding, a pin hole PH having a micropore configuration is generated, as shown in FIG. 3. Such pin holes PH may deteriorate an appearance of the welding portion W and may be major causes of interfacial fractures at the welding portion W. Therefore, welding strength may be deteriorated.

Meanwhile, control factors which affect on a depth of the pin hole PH may be an output of the laser beam, welding speed, a defocusing amount, a width of the welding pattern, and so on. However, generation of the pin holes PH may not be basically prevented only by controlling such control factors.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of laser welding having advantages of suppressing generation of pin holes and enhancing appearance and welding strength of a welding portion by adding a fine welding pattern to an end portion of a main welding pattern of the welding portion and additionally melting a peripheral portion of a keyhole formed at the end portion of the welding portion when the laser welding is performed after at least two steel plates are overlapped.

A method of laser welding according to various aspects of the present invention may be performed after an upper steel plate and a lower steel plate are overlapped.

The method may include: forming a molten pool at the upper steel plate and the lower steel plate and welding the upper steel plate and the lower steel plate by irradiating a laser beam of focal region to a welding portion of the upper steel plate and the lower steel plate along a main welding pattern; and melting a peripheral portion of a keyhole formed at an end of the main welding pattern and welding the upper steel plate and the lower steel plate by irradiating the laser beam of the focal region along a fine welding pattern added to an end portion of the main welding pattern.

The main welding pattern may have a continuous sine wave configuration.

The fine welding pattern may proceed from the end of the main welding pattern in a direction opposite to a moving direction of the main welding pattern and may cross the main welding pattern.

The fine welding pattern may be formed within half of a pitch of the main welding pattern.

Both ends of the fine welding pattern may be positioned on the main welding pattern.

The fine welding pattern may have a zigzag configuration where V-shapes are repeated.

The upper steel plate and the lower steel plate may be welded in a state of being overlapped with a gap.

The gap may be smaller than or equal to 30% of a thickness of the steel plate.

At least one of the upper steel plate and the lower steel plate may be a galvanized steel plate.

A method of laser welding according to other various aspects of the present invention may include: a first step where a molten pool is formed at the upper steel plate and the lower steel plate, and the upper steel plate and the lower steel plate are welded by irradiating a laser beam of focal region to a welding portion of the upper steel plate and the lower steel plate along a main welding pattern having a continuous sine wave; and a second step where a peripheral portion of a keyhole formed at an end of the main welding pattern is melted, and the upper steel plate and the lower steel plate are welded by irradiating the laser beam of the focal region along a fine welding pattern having a zigzag configuration, wherein the fine welding pattern proceeds from the end of the main welding pattern in a direction opposite to a moving direction of the main welding pattern and crosses the main welding pattern.

The zigzag configuration may be formed by repeating V-shapes continuously.

The fine welding pattern may be formed within half of a pitch of the main welding pattern.

Both ends of the fine welding pattern may be positioned on the main welding pattern.

The upper steel plate and the lower steel plate may be welded in a state of being overlapped with a gap.

The gap may be smaller than or equal to 30% of a thickness of the steel plate.

At least one of the upper steel plate and the lower steel plate may be a galvanized steel plate.

DESCRIPTION OF SYMBOLS

Figure 1:
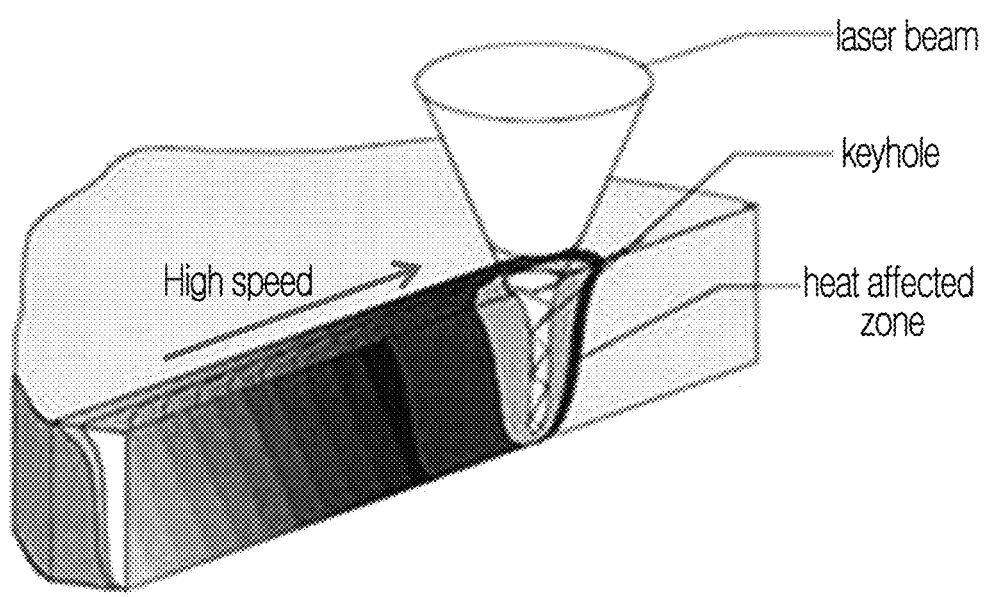
FIG. 1 is a schematic diagram for illustrating a conventional keyhole welding method.
Figure 2:
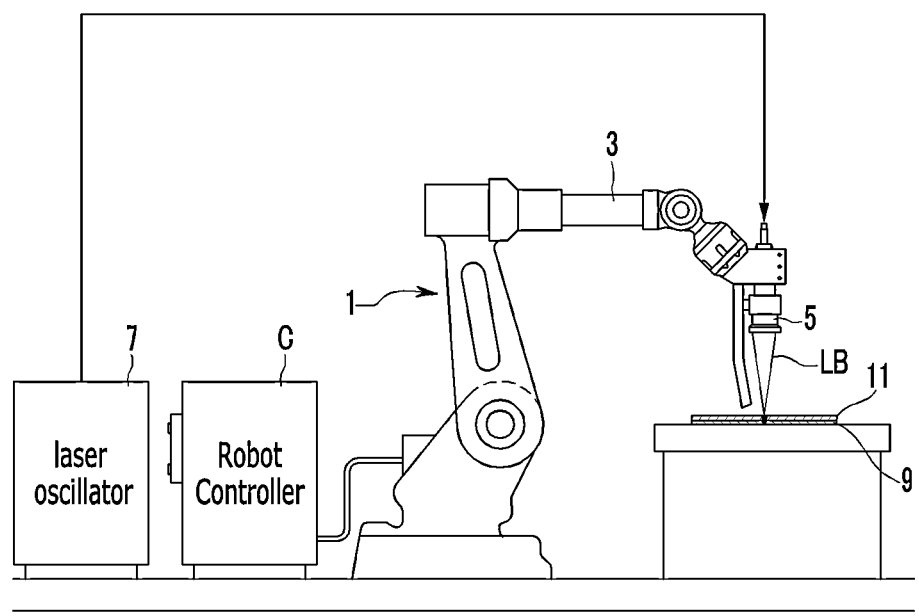
FIG. 2 is a schematic diagram of a laser welding system.
Figure 3:
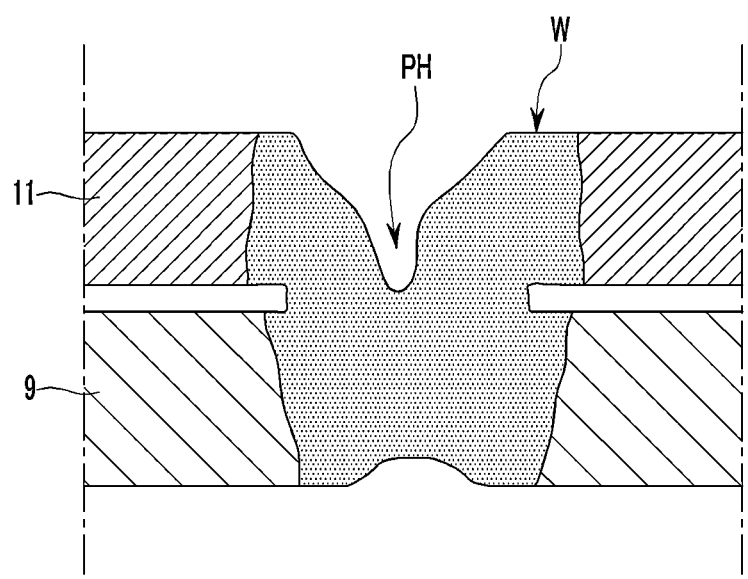
FIG. 3 is a cross-sectional view of a base metal where a pin hole is formed at an end of a welding portion by a conventional laser welding.

| 11: upper steel plate | 9: lower steel plate |
| P1: main welding pattern | P2: fine welding pattern |
| LB: laser beam | W: welding portion |
| PH: pin hole | |

DETAILED DESCRIPTION OF THE EMBODIMENTS

An Exemplary embodiment of the present invention will be described in detail with reference to the accompanying drawings.

Size and thickness of components shown in the drawings may be differ from real size and real thickness of the components for better comprehension and ease of description, and thicknesses of some portions and regions are drawn with enlarged scale.

In addition, description of components which are not necessary for explaining the present invention will be omitted, and the same constituent elements are denoted by the same reference numerals in this specification.

Figure 4:
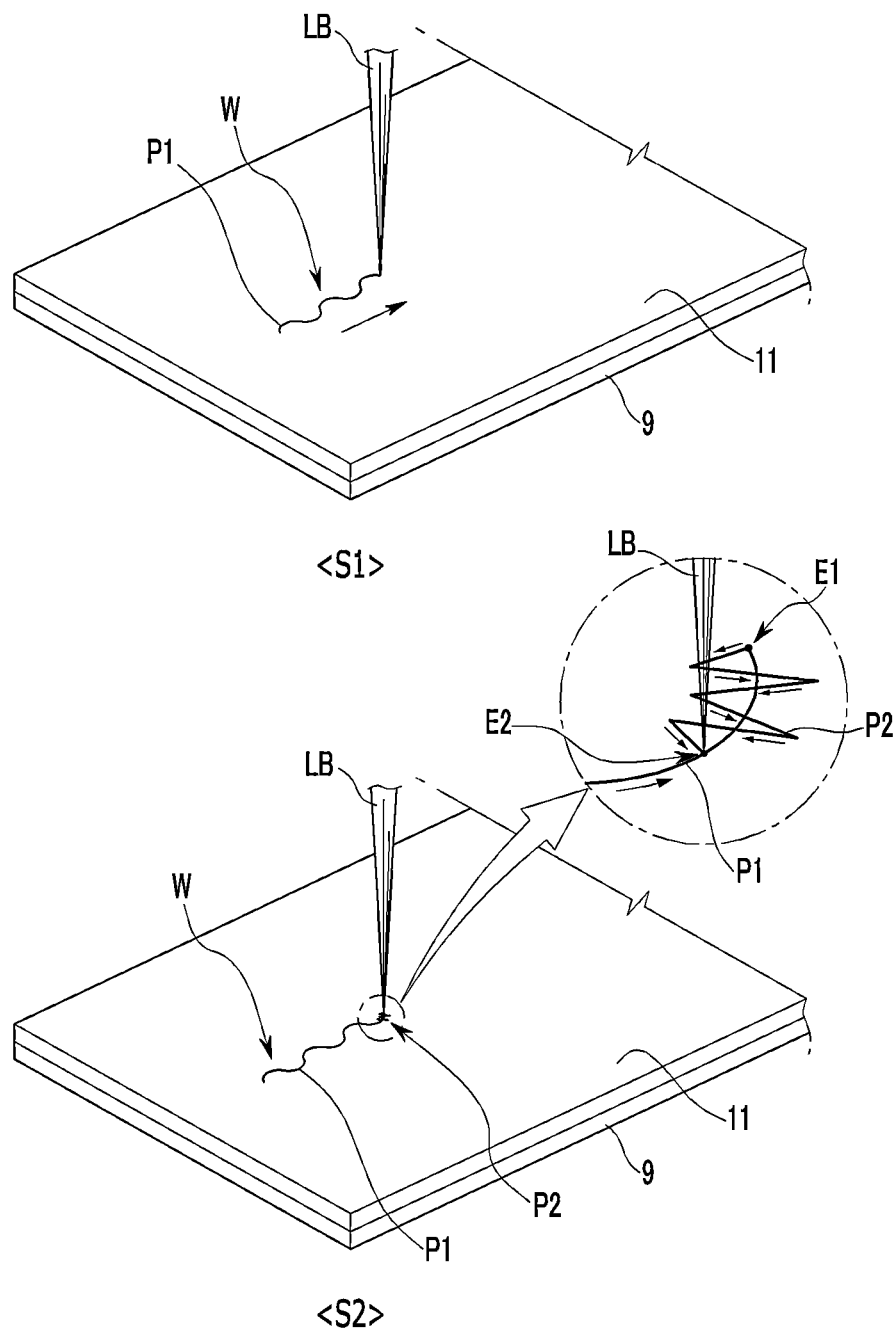
FIG. 4 is a schematic diagram for showing processes of a laser welding according to an exemplary embodiment of the present invention.
Figure 5:
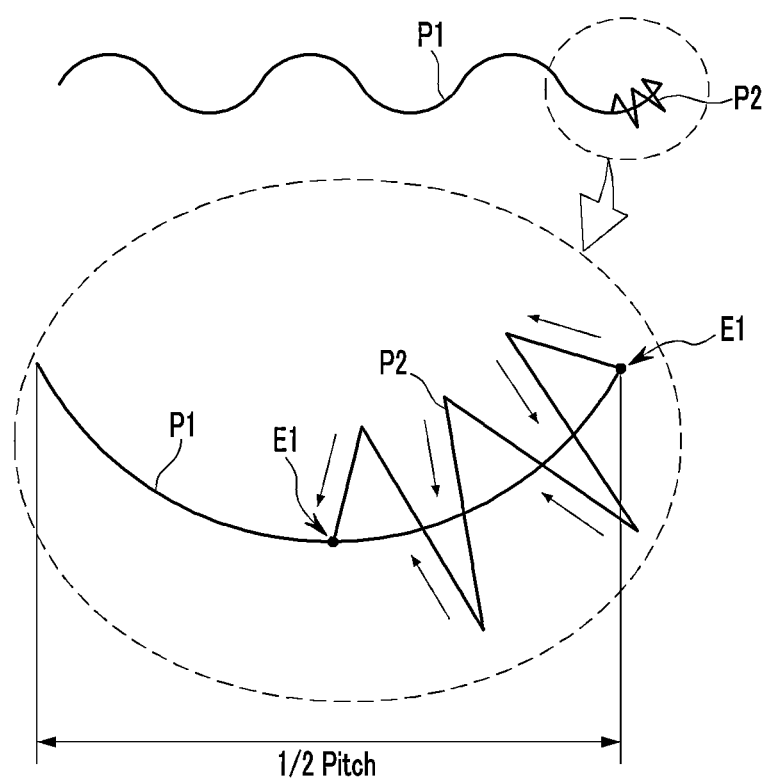
FIG. 5 is a schematic diagram for illustrating a main welding pattern and a fine welding pattern applicable to a method of laser welding according to an exemplary embodiment of the present invention.
Figure 6:
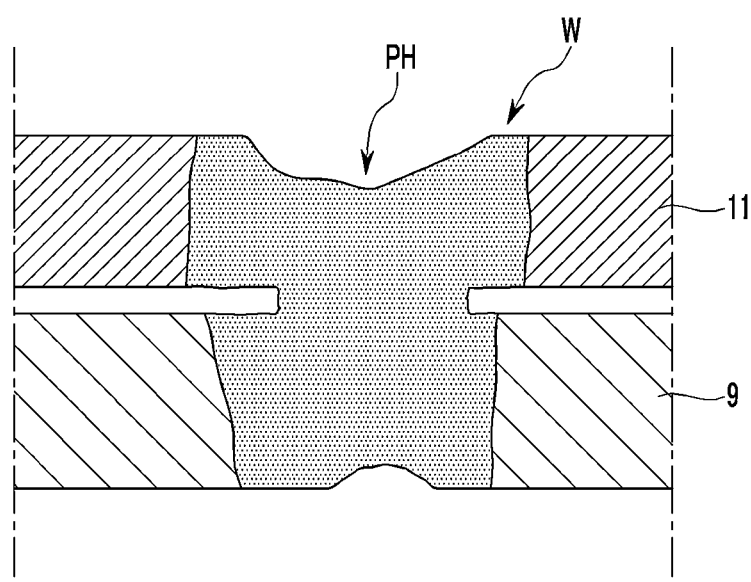
FIG. 6 is a cross-sectional view of an end portion of a welding portion formed by a method of laser welding according to an exemplary embodiment of the present invention.

FIG. 4 is a schematic diagram for showing processes of a laser welding according to an exemplary embodiment of the present invention; FIG. 5 is a schematic diagram for illustrating a main welding pattern and a fine welding pattern applicable to a method of laser welding according to an exemplary embodiment of the present invention; and FIG. 6 is a cross-sectional view of an end portion of a welding portion formed by a method of laser welding according to an exemplary embodiment of the present invention.

A method of laser welding according to an exemplary embodiment of the present invention is performed after at least two steel plates or plated steel plates are overlapped with each other. Particularly, the method may reduce generation of pin holes PH at an end portion of a welding portion W to which the laser welding is performed.

Referring to FIG. 4, a method of laser welding according to an exemplary embodiment of the present invention is executed based on at least two welding patterns including a main welding pattern P1 and a fine welding pattern P2.

That is, a laser beam LB of focal region is irradiated along the main welding pattern P1 to the welding portion W of an upper steel plate 11 and a lower steel plate 9 that are overlapped with each other so as to form a molten pool at the upper steel plate 11 and the lower steel plate 9. That is, the upper steel plate 11 and the lower steel plate 9 are primarily welded along the main welding pattern P1 at step S1.

After that, the laser beam LB of the focal region is irradiated with a high speed along the fine welding pattern P2 added to an end portion of the main welding pattern P1 so as to melt a peripheral portion of a keyhole formed at the end portion of the main welding pattern P1. That is, the upper steel plate 11 and the lower steel plate 9 are secondarily welded along the fine welding pattern P2 at step S2.

Referring to FIG. 5, the main welding pattern P1 is formed as a continuous sine wave having a predetermined length.

In addition, the fine welding pattern P2 proceeds from the end of the main welding pattern P1 in a direction opposite to a moving direction of the main welding pattern P1 and crosses the main welding pattern P1 several times. The fine welding pattern P2 has a zigzag configuration where V-shapes are repeated continuously.

In addition, the fine welding pattern P2 may be formed within half of a pitch of the main welding pattern P1. If necessary, the fine welding pattern P2 may be formed with a length longer than half of the pitch of the main welding pattern P1.

In addition, both ends of the fine welding pattern P2 are connected to the main welding pattern P1. Referring to FIG. 5, in a state that an end E1 of the fine welding pattern P2 is connected to the end of the main welding pattern P1, the fine welding pattern P2 crosses the main welding pattern P1 several times and the other end E2 of the fine welding pattern P2 is positioned on a side portion of the main welding pattern P1.

Meanwhile, at least one of the upper steel plate 11 and the lower steel plate 9 is a plated steel plate, and particularly a galvanized steel plate. In a case that the upper steel plate 11 and the lower steel plate 9 are plated steel plates, a gap is formed between the upper steel plate 11 and the lower steel plate 9 such that the upper steel plate 11 and the lower steel plate 9 are welded in a state of being overlapped with each other.

The gap formed between the upper steel plate 11 and the lower steel plate 9 may be smaller than or equal to 30% of a thickness of one steel plate. In this case, welding stability may be secured.

As shown in FIG. 4, the laser beam LB is irradiated to the welding portion W of the upper steel plate 11 and the lower steel plate 9 overlapped with each other along the main welding pattern P1 having the sine wave configuration such that a keyhole welding is executed on the upper steel plate 11 and the lower steel plate 9 in the method of laser welding according to an exemplary embodiment of the present invention. After that, the peripheral portion of the keyhole formed at the end of the welding portion W is additionally melted by performing keyhole welding with a high speed on the upper steel plate 11 and the lower steel plate 9 along the fine welding pattern P2 added to the end portion of the main welding pattern P1. Since the keyhole is filled due to additional melting, generation of the pin holes PH is suppressed, as shown in FIG. 6.

Since the generation of the pin holes PH is minimized at the end portion of the welding portion W, appearance and welding strength of the welding portion W may be enhanced.

The method of laser welding according to an exemplary embodiment of the present invention can be applied to plated steel plates requiring the gap therebetween as well as typical steel plates. In this case, welding strength of the end portion of the welding portion W may be also secured.

Meanwhile, defocusing amount of the laser beam LB may be within +f 20 mm-30 mm.

Figure 7:
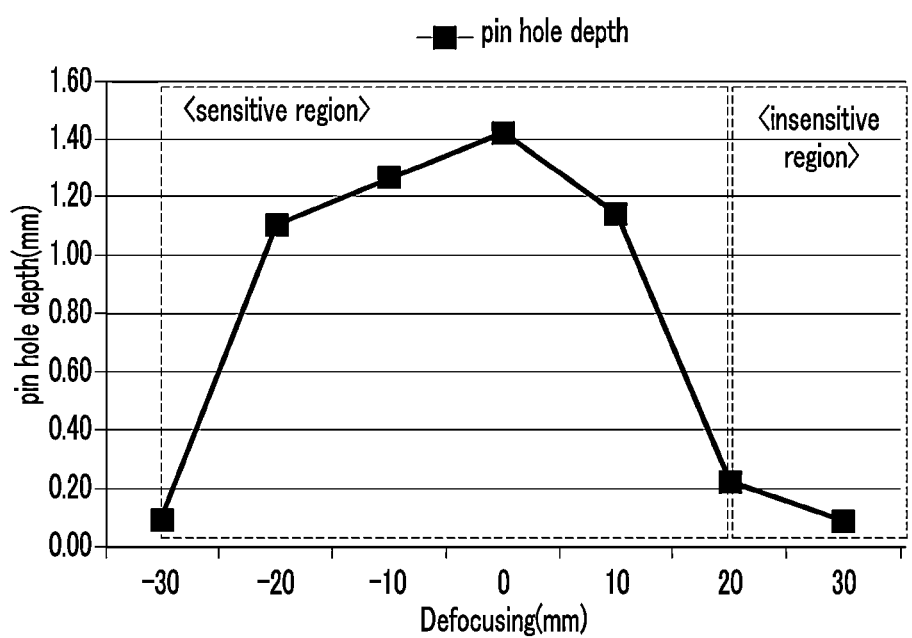
FIG. 7 is a graph for showing a relation between a pin hole depth and a defocusing amount of a laser beam applied to a method of laser welding according to an exemplary embodiment of the present invention.

A depth of the pin hole PH is changed according to the defocusing amount (f) of the laser beam LB. However, as shown in FIG. 7, if the welding is performed in a region where the defocusing amount of the laser beam LB is within +f 20 mm-30 mm, the depth of the pin hole PH is narrow and sensitivity of the depth of the pin hole PH according to a focal distance is low.

The peripheral portion of the keyhole formed at the end portion of the welding portion is additionally melted by adding the fine welding pattern to the end portion of the main welding pattern according to an exemplary embodiment of the present invention when the laser welding is performed after at least two steel plates are overlapped with each other. Therefore, generation of the pin holes may be suppressed.

In addition, appearance and welding strength of the welding portion may be enhanced.

Further, in a case of the plated steel plates as well as the typical steel plates, the molten pool is formed at the end portion of the welding portion. Therefore, sufficient welding strength may be secured.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of laser welding by applying a main welding pattern and a fine welding pattern in sequence to an upper steel plate and a lower steel plate that are overlapped, the method comprising:
    forming a molten pool at the upper steel plate and the lower steel plate;
    welding the upper steel plate and the lower steel plate by irradiating a main welding pattern having a continuous sine wave form to a welding portion of the upper steel plate and the lower steel plate along the main welding pattern; and
    irradiating a fine welding pattern proceeding in sequence from the end of the main welding pattern in a direction opposite to a moving direction of the main welding pattern, the fine welding pattern being irradiated with zigzag crossing along the main welding pattern subsequent to the end of the main welding pattern being irradiated, wherein
    a peripheral portion of a keyhole formed at an end of the main welding pattern is additionally melted to suppress pin holes generated at an end of the main welding pattern.

2. The method of claim 1, wherein the fine welding pattern is formed within half of a pitch of the main welding pattern.

3. The method of claim 1, wherein both ends of the fine welding pattern are positioned on the main welding pattern.

4. The method of claim 1, wherein the fine welding pattern has a zigzag configuration where V-shapes are repeated.

5. The method of claim 1, wherein the upper steel plate and the lower steel plate are welded in a state of being overlapped with a gap.

6. The method of claim 5, wherein the gap is smaller than or equal to 30% of a thickness of the steel plate.

7. The method of claim 1, wherein at least one of the upper steel plate and the lower steel plate is a galvanized steel plate.

8. A method of laser welding by applying a different welding pattern in sequence to an upper steel plate and a lower steel plate that are overlapped, the method comprising:
    forming a molten pool at the upper steel plate and the lower steel plate;
    irradiating a first welding pattern having a continuous sine wave to the upper steel plate and the lower steel plate by irradiating a laser beam to a welding portion of the upper steel plate and the lower steel plate along a main welding pattern; and
    irradiating a second welding pattern proceeding in sequence from the end of the first welding pattern in a direction opposite to a moving direction of the first welding pattern, the second welding being irradiated with zigzag crossing along the first welding pattern subsequent to the end of the first welding pattern being irradiated, wherein
    a peripheral portion of a keyhole formed at an end of the first welding pattern is additionally melted to suppress pin holes generated at an end of the first welding pattern.

9. The method of claim 8, wherein the second welding pattern is a fine welding pattern that is formed within half of a pitch of the main welding pattern.

10. The method of claim 8, wherein both ends of the fine welding pattern are positioned on the first welding pattern which is a main welding pattern.

11. The method of claim 8, wherein the upper steel plate and the lower steel plate are welded in a state of being overlapped with a gap.

12. The method of claim 11, wherein the gap is smaller than or equal to 30% of a thickness of the steel plate.

13. The method of claim 8, wherein at least one of the upper steel plate and the lower steel plate is a galvanized steel plate.

* * * * *